(No Model.)

F. O. JOHNSON.
NUT LOCK.

No. 605,788.  Patented June 14, 1898.

Witnesses
W. S. Van Loan.
C. P. Walker
Victor J. Evans

Inventor
Frank O. Johnson.

by John Wedderburn
Attorney

UNITED STATES PATENT OFFICE.

FRANK O. JOHNSON, OF NORTH CLARENDON, PENNSYLVANIA.

NUT-LOCK.

SPECIFICATION forming part of Letters Patent No. 605,788, dated June 14, 1898.

Application filed July 12, 1897. Serial No. 644,256. (No model.)

*To all whom it may concern:*

Be it known that I, FRANK O. JOHNSON, of North Clarendon, in the county of Warren and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to an improvement in nut-locks, my object being to provide a construction of washer by which a nut will be firmly held upon its bolt, the nut and bolt-plate being of usual construction.

The invention consists in the various matters hereinafter described and claimed.

Figure 1:
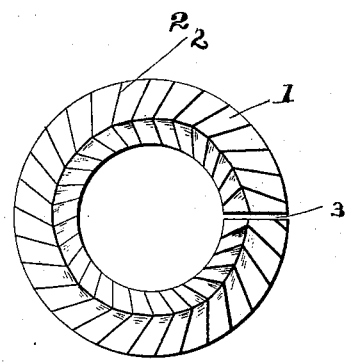
Figure 2:
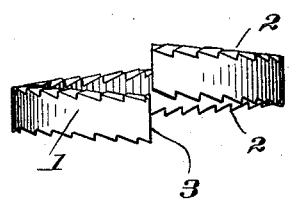
Figure 3:
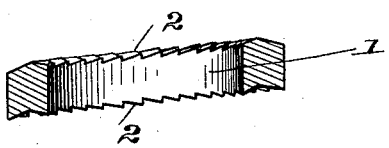

In the accompanying drawings, which illustrate my invention, Figure 1 is a front elevation of the present washer. Fig. 2 is a side view thereof, and Fig. 3 is a section.

Referring now more particularly to the drawings, the present washer comprises a preferably spiral ring 1, of steel or other suitable material, said ring having upon its faces ratchet-teeth 2, which point in opposite directions upon the two sides of the ring. Manifestly when the present washer is applied over the end of a bolt and the nut screwed home the teeth will bear into the member in which the bolt is seated and also into the inner face of the nut, the teeth, pointing as they do in opposite directions, serving to lock the nut against movement.

In order to facilitate the entrance of the washer into the nut and the member in which the bolt is seated, the side faces of the washer lie at an oblique angle to the walls of the washer, thus presenting a biting edge upon each face. For convenience and economy of construction these side faces are preferably parallel, so that the biting edge is formed upon the outer portion of one face and upon the inner portion of the opposite face. Furthermore, by reason of this formation of the faces of the washer when the nut is screwed home the washer is slightly turned upon the raised edges. Thus when the initial roughness of the base-plate on the nut wears the washer tends to take position with its inside and outside edges at right angles to the base and nut, whereby the washer will still lie tightly between the members. The same action follows incident to the lengthening of a long bolt in hot weather.

It will be noticed that the ratchet-teeth 2 are of angular shape. The object of this is to more firmly hold the nut when in position and also to prevent any liability of the washer expanding at its split portion 3 during the operation of screwing the nut home. Were the teeth perfectly straight the washer could slide in the direction of the teeth upon the nut and thus open the space between the ends of the washer; but in the present structure, the teeth being of angular form, one portion of a tooth serves to hold the other from sliding outwardly upon the nut.

The present device is simple in construction, cheap to manufacture, but extremely efficient in operation.

Having thus described my invention, what I claim as new, and desire to secure by Letters Patent, is—

As an improved article of manufacture, a nut-lock of the type comprising a split spiral ring or washer formed upon its opposite faces with ratchet-teeth of angular shape extending in opposite directions from the central line of said ring, with the meeting-point of said teeth upon one face of the nut-lock elevated and those upon the opposite side depressed, all substantially as and for the purpose specified.

In testimony whereof I have signed this specification in the presence of two subscribing witnesses.

FRANK O. JOHNSON.

Witnesses:
MAX KOCH,
MORRIS BENDER.